(12) United States Patent
Kim

(10) Patent No.: US 7,106,724 B2
(45) Date of Patent: Sep. 12, 2006

(54) SYSTEM AND METHOD FOR QUERYING AND RECOVERING CIRCUIT GROUP STATE IN A SWITCHED NETWORK

(75) Inventor: Byeong Hak Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1045 days.

(21) Appl. No.: 09/984,161

(22) Filed: Oct. 29, 2001

(65) Prior Publication Data

US 2002/0052949 A1    May 2, 2002

(30) Foreign Application Priority Data

Oct. 30, 2000    (KR) ............................... 2000-63991

(51) Int. Cl.
*H04L 12/46* (2006.01)

(52) U.S. Cl. ...................... 370/352; 379/268
(58) Field of Classification Search ............... None
See application file for complete search history.

(56) References Cited

U.S. PATENT DOCUMENTS

| 5,034,854 A | 7/1991 | Matsumura et al. |
|---|---|---|
| 5,589,808 A | 12/1996 | Clark et al. |
| 5,991,293 A * | 11/1999 | Buchanan et al. ............ 370/353 |
| 6,151,315 A * | 11/2000 | Ash et al. ..................... 370/352 |

* cited by examiner

*Primary Examiner*—Creighton Smith
(74) *Attorney, Agent, or Firm*—Fleshner & Kim, LLP (57) ABSTRACT

Disclosed is a system and method for querying and recovering circuit group state in a switching system. A self station searches processors including circuit groups which are allocated to a certain route, and requests circuit group state from the searched processors successively. The processors receiving the request identify whether or not a corresponding circuit is allocated to the certain route by reviewing all circuits included in the processors. In addition, the processor groups circuits which are successively allocated among the circuits allocated to the certain route, and queries state of the circuits by generating one CQM per group. When the query process is completed by the processors, the self station reports results of the circuit group state query to an operator. Therefore, the operator can query the states of circuit groups as a route unit in the self station.

15 Claims, 9 Drawing Sheets

| CIRCUIT STATE RECOGNIZED BY SELF STATION | | RECOVERY RPOCESS | CIRCUIT STATE RECOGNIZED BY COUNTER PART STATION | |
|---|---|---|---|---|
| NEAR-END STATE | FAR-END STATE | | NEAR-END STATE | FAR-END STATE |
| ACTIVE | ACTIVE | RBLO(MA)SETTING,UBL TRANSMISSION | MA | MA |
| | | RBLO(HW)SETTING,CGU TRANSMISSION | HW | HW |
| | | RBLO(MA)SETTING | MA | ACTIVE |
| | | RBLO(HW)SETTING | HW | ACTIVE |
| | | RBLO(HW)SETTING,UBL TRANSMISSION | HW | MA |
| | | RBLO(MA)SETTING,CGU TRANSMISSION | MA | HW |

SYSTEM AND METHOD FOR QUERYING AND RECOVERING CIRCUIT GROUP STATE IN A SWITCHED NETWORK

BACKGROUND OF THE INVENTION

1. Field of the Invention

The present invention relates to communications, and particularly, to a system and method for messaging and signaling a switched network environment.

2. Background of the Related Art

Generally, Common Channel Signaling (CCS) is a method separating traffic or bearer lines on which data is transferred from signaling lines on which messages and signals are sent. A network adopting CCS includes signaling points connected through signaling links, and bearer lines which may include multiple trunk circuits (channels). A signaling link refers to a physical connection between two signaling points. A route is a series of communication network links connected from an origination point to a destination point, and refers to a logical connection. A communication network adopting Signaling System No. 7 as the CCS method is considered in the present invention.

Figure 1:
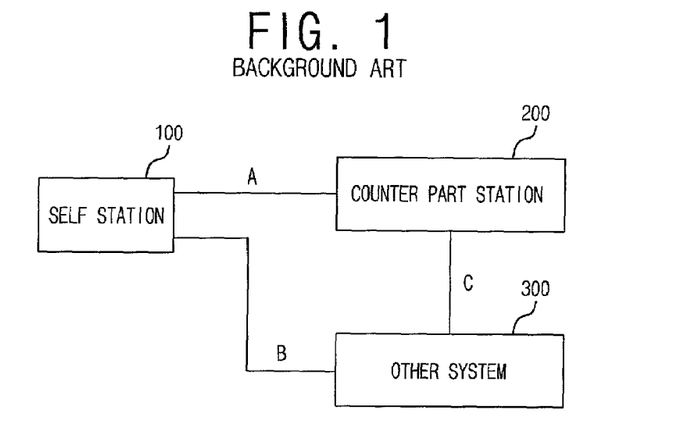
FIG. 1 is a block diagram showing an example of a Signaling System No. 7 network structure formed between general switching systems.

FIG. 1 is a block diagram showing a structure of a Signaling System No. 7 network formed between two switching systems. As shown therein, if a data transfer process is initiated from a certain self station 100 to a certain counterpart station 200, self station 100 may first determine a route A on which the signal is transmitted, then may select a circuit from a circuit group in a trunk which is included in the self station for transmission of the data. FIG. 1 also illustrates another system 300 logically connected to self station 100 and counter part station 200 by routes B and C, respectively.

Figure 2:
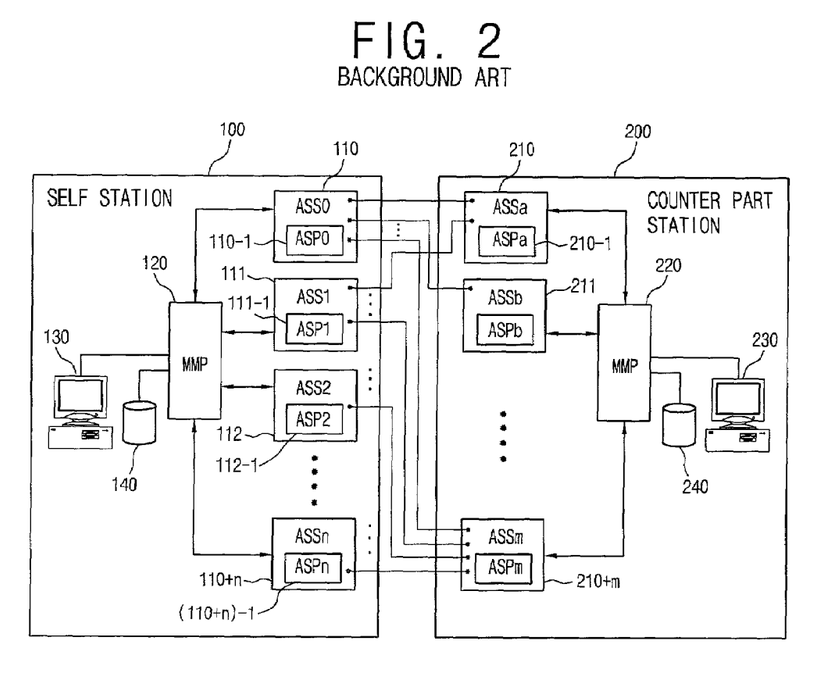
FIG. 2 is a block diagram showing a general inner structure of a self station and of a counter part station, and showing a physical connection structure from the self station to the counter part station.

FIG. 2 is a block diagram showing inner structures of self station 100 and of counter part station 200 and showing a physical connection structure from self station 100 to counter part station 200. As shown therein, the inner structure of self station 100 and of counter part station 200 which are similar to each other. Self station 100 includes a plurality of Access Switching Subsystems (ASS), 110 to (110+n), having trunk circuits for communicating with counter part station 200; a Man Machine Processor (MMP) 120 connected to the plurality of ASS 110 to (110+n) for maintaining and repairing the network; an operator terminal 130 for interfacing the MMP 120 and the operator; and a database 140 connected to the MIP 120 for storing information necessary for operation, maintenance, and repair.

The respective ASS 110 to (110+n) includes an Access Switching Processor (ASP), (110–1) to (110+n–1), controlling the state of the trunk circuit and the signal transmission process. For example, in case of route A from the self station 100 to counter part station 200 as shown in FIG. 1, self station 100 bundles trunk circuits which are allocated to the route A as link units and arranges the link units on a plurality of corresponding ASS 100 to (110+n). Therefore, when an unexpected error is generated on the ASP in the ASS, another ASS can be substituted. Thus, the signal transmission between self station 100 and the counter part station 200 through the route A can be performed stably.

As shown in FIG. 3A, the respective ASS 110 to (110+n) in the self station 100 may include 4096 trunk circuits, and the trunk circuits may be bound as link units. The trunk circuits of each link unit are allocated to a route.

Self station 100 stores the states of the trunk circuits in the database 140 and manages them, and counter part station 200 stores the states of the trunk circuits in a database 240 and manages them. The states of the circuits read and stored by self station 100 and by counter part station 200 are synchronized with each other, and therefore the signal transmission between self station 100 and counter part station 200 can be made normally. Therefore, self station 100 and counter part station 200 should continually check whether the states of the circuits read and stored by the two stations are synchronized or not.

In the background art, the states of circuits are inquired as a link unit. Therefore, in order to inquire as to the state of a circuit group allocated to a certain route, the operator must begin by identifying a specific ASS among the plurality of ASS which contain circuit(s) allocated to the route in question. When the operator enters the specific ASS, an identification code and a range of circuits into operator terminal 130 of self station 100, the specific ASS generates a Circuit group Query Message (CQM) according to the above command and transmits the message to counter part station 200.

When a Circuit group Query Response message (CQR) is returned from the counter part station 200, the specific ASS in self station 100 analyzes the CQR. In addition, the specific ASS determines whether or not the state of circuit group managed by self station 100 and the state of circuit group managed by counter part station 200 are synchronized with each other. If the states of the circuit groups managed by self station 100 and by counter part station 200 are not synchronized with each other, the specific ASS in self station 100 performs a recovery process for synchronizing the state information.

The range of circuit groups which will be inquired is set to be less than 32 in accordance with recommendations Q761 through Q763 of ITU-T (International Telecommunication Union-Telecommunication Sector) for signaling system No. 7. Therefore, if the operator does not recognize a link on which the state of a circuit has an error, or if there are many circuits which are not synchronized with those of counter part station 200 among the circuits allocated to a certain route and the circuits are dispersed in various links, the operator may be forced to query the state of all circuits within counter part station 200.

For example, if the operator inputs a command for querying the state of a circuit group such as "ASS=0, identification code of the circuit which will be inquired =0, and the range of the circuit group which will be inquired=32" into operator terminal 130 of self station 100, a CQM is generated and circuit state query is performed for the link corresponded to the identification code 0~31 of the circuits which will be inquired among the circuits which are disposed on a first ASS (ASS0) 110. When the query is completed, the operator inputs a command for querying the state of a circuit group such as "ASS=0, identification code of circuit which will be inquired=32, and the range of circuit group=32" again into operator terminal 130. As in the method described above, the operator may then input a command for querying the states of circuit group such as "ASS=n, identification code of circuits which will be inquired=N, and range of circuit group which will be inquired=R (1~32)" into the operator terminal 130, and thereby query circuit state of all links inside self station 100.

Several disadvantages exist with current systems and methods. For example, according to the background method of querying the state of a circuit group in the switching system, the circuit group state query is made by link unit. Where the state query must be performed for all circuit groups, the operator must perform repeated operations.

Therefore the method is inconvenient and a long time is needed to inquire the state of all circuit groups.

In addition, in order to inquire the state of a certain circuit group allocated to a certain route in the self station, an operator must know which circuits are disposed on each subsystem of self station 100, and which routes each circuit is allocated to. This is an inconvenient requirement. Further, the background method for querying circuit group state in the switching system requires too much operating time; thus operating efficiency is greatly lowered. Moreover, a recovery process must be performed when the states of the circuit managed by self station 100 and of the circuit managed by the counter part station 200 are not synchronized with each other. However, the recovery process is not described clearly in the recommendation. Other problems also exist with background systems and methods for monitoring circuit group state in switched networks.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to provide a system and method for querying and recovering circuit group state in a switching system whereby query for circuit group state in a trunk between switching systems may be performed as a route unit.

Another object of the present invention is to provide a system and method for querying and recovering circuit group state in a switching system whereby a series of processes for searching a plurality of processors including the circuit group allocated to a certain route may be launched automatically by searching a first processor, in case that a circuit group allocated to a certain route is dispersed in a plurality of processors.

Still another object of the present invention is to provide a system and method for querying and recovering circuit group state in a switching system whereby querying and recovering state of a circuit group allocated to a certain route may be performed by an operator's command which designates a certain route which needs query, and whereby the convenience of operating can be increased.

Still another object of the present invention is to provide a system and method for querying and recovering circuit group state in a switching system whereby a recovery process can be initiated when the states for a certain circuit read and stored by a self station and by a counter part station are not synchronized with each other.

To achieve these and other advantages and in accordance with the purpose of the present invention, as embodied and broadly described herein, there is provided a method for querying and recovering circuit group state in a switching system comprising: inputting a command for querying states of circuit groups as a route unit; and performing query for the circuit group states as a route unit in accordance with the inputted command.

In addition, to achieve these objects of the present invention, there is provided a system for querying and recovering circuit group state in a switching system comprising: a self station for originating a route; and a counterpart station at the destination of a route, wherein the self station is configured to receive a command for querying states of circuit groups as a route unit, and wherein the self station and the counter part station are configured to perform the query for the circuit group states as a route unit in accordance with the received command.

In addition, to achieve these objects of the present invention, there is provided a method for querying and recovering circuit group state in a processor of a switching system including identifying whether a circuit is allocated to a certain route by successively selecting all circuits included in a processor, when a request for querying the circuit in the certain route is received from a maintenance system, grouping circuits allocated continuously among the circuits which are allocated to the certain route, generating CQM in accordance with the circuit groups, transmitting the generated CQM to a counter part station, receiving CQR which is a response message for the CQM from the counter part station, collecting states of the respective circuits included in the CQM, comparing the states of respective circuits included in the CQR to the collected states of the respective circuits, performing a recovery process where the states of the respective circuits included in the CQR and the states of the collected circuits are not synchronized to each other, and transmitting a CRM for reporting the result of the recovery process to the maintenance system.

In addition, to achieve these objects of the present invention, there is provided a switching station, including an operator terminal for receiving commands, a man machine processor (MMP) coupled to the operator terminal, configured to receive a command from the operator terminal, and further configured to maintain and repair a network, a database coupled to the man machine processor for storing information related to maintenance and repair of the network, and a plurality of access switching substations (ASS's) coupled to the man machine processor, wherein each of the plurality of ASS's include an access switching processor (ASP) configured to control the state of circuit switches in the network.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 3:
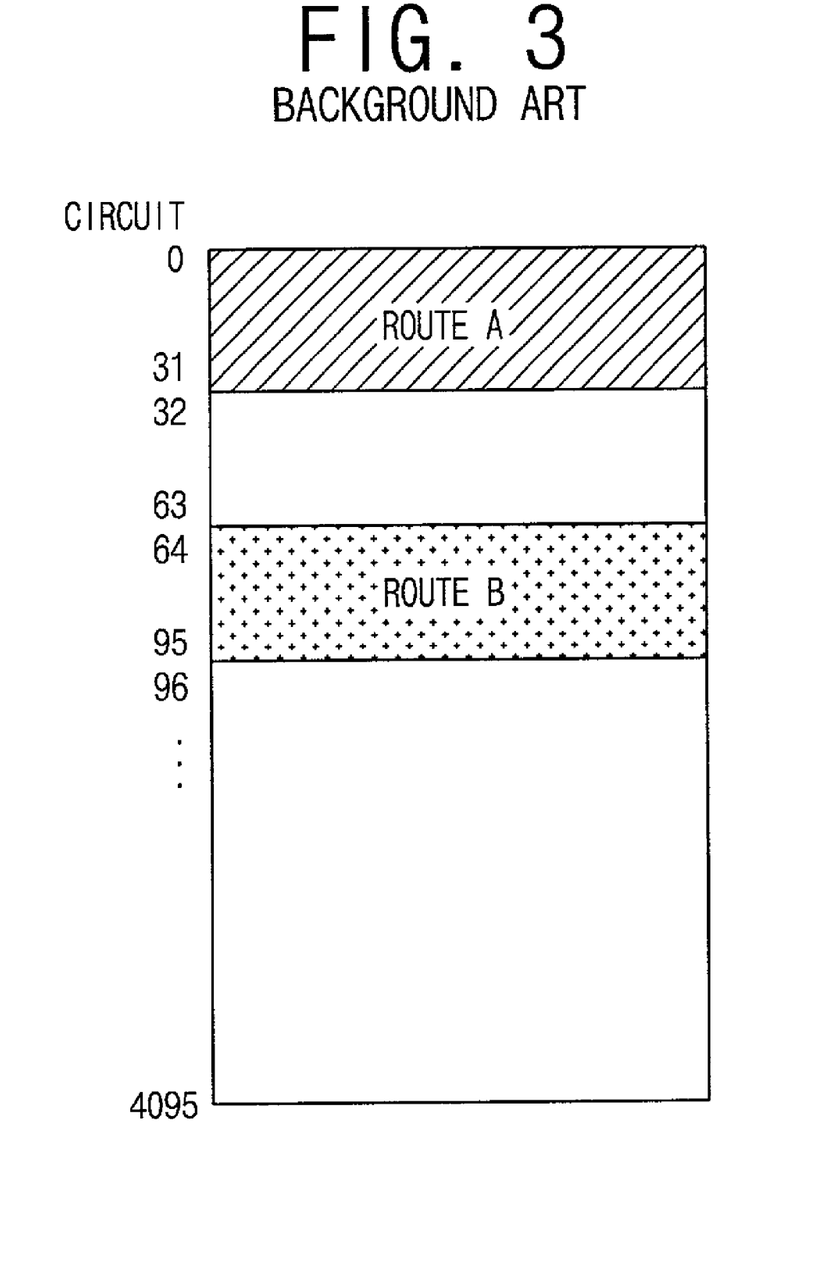
FIG. 3 is a block diagram showing multiple trunk circuits included in a single ASS which are allocated to various routes.

As shown in FIG. 1, there may be various routes from a self station 100 to a counter part station 200 in a signaling network. 4096 circuits included in a certain ASS (Access Switching Subsystem) in the self station 100 may be allocated to a plurality of routes as shown in FIG. 3.

Figure 4A:
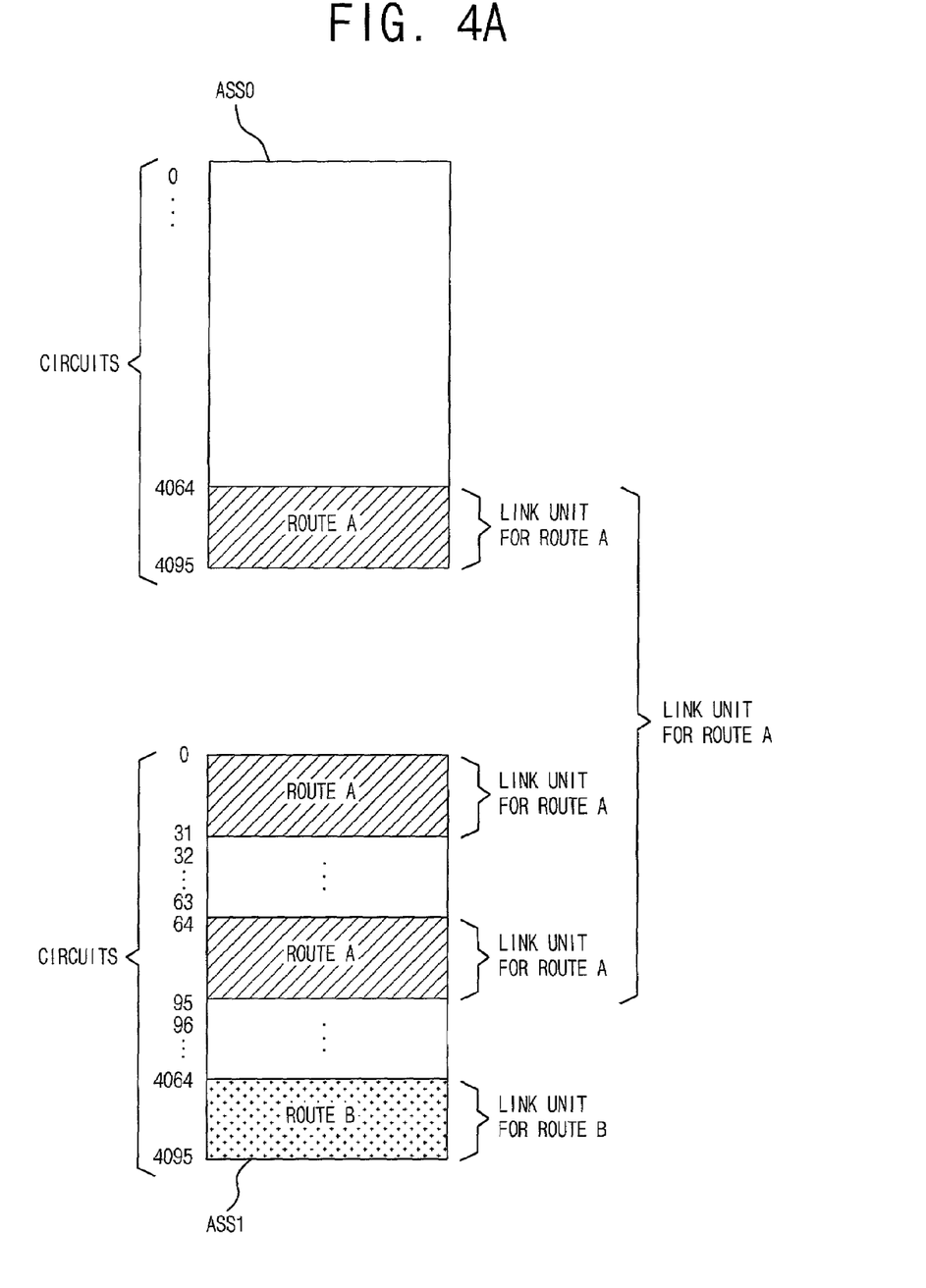
FIG. 4A is a block diagram showing how a route unit may be a combination of several link units under the control of multiple Access Switching Processors, according to a preferred embodiment of the invention.

FIG. 4A illustrates that circuit groups included in route A may be contained in link units associated with different ASS processors. Query of circuit group state as a route unit according to the present invention is made such that all ASS processors including circuit groups allocated to the certain route, for example route A, may be ordered to perform the query of the circuit group state as link units successively. Therefore, MMP 120 in the switching system may access a first database 140 for determining which ASP contain circuits allocated to route A. Also, respective ASPs in the switching system may include a second database (not shown) for determining which circuits are allocated to each route.

Figure 4B:
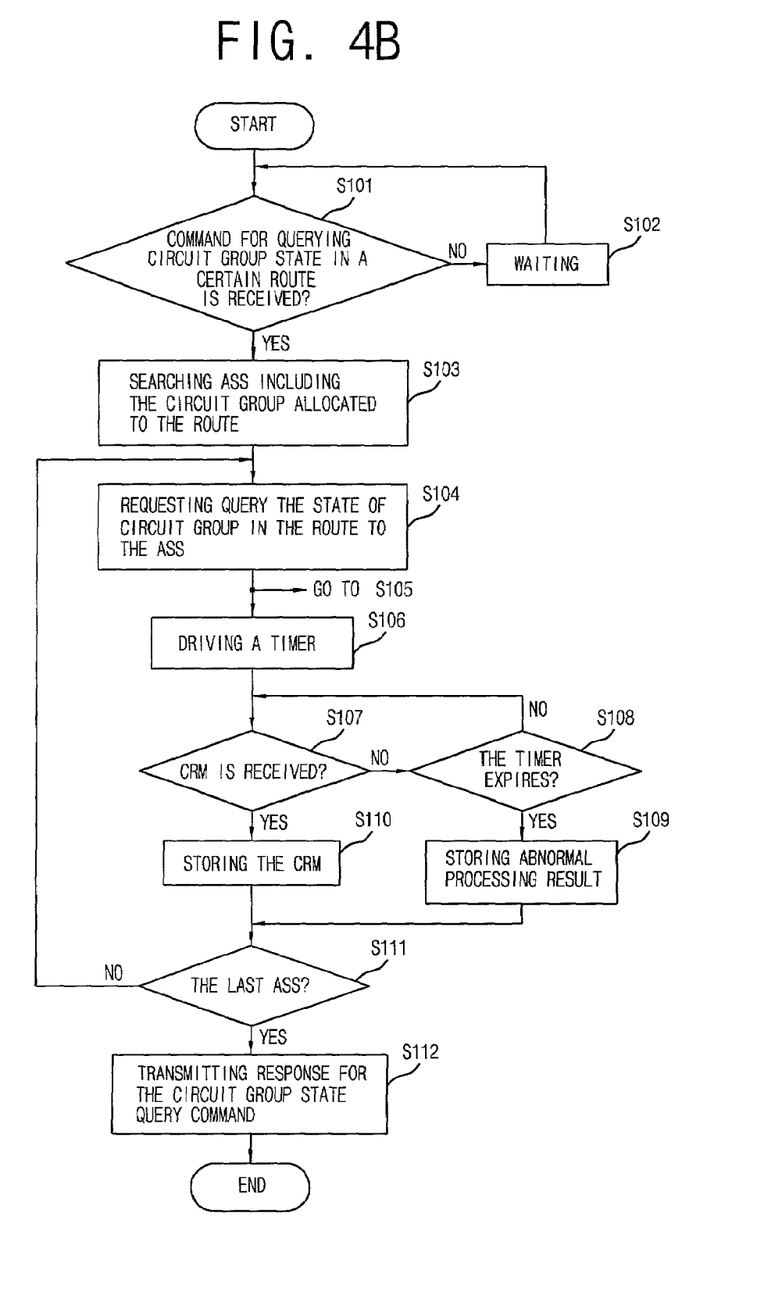
FIG. 4B is a flow chart showing a method of querying and recovering circuit group state in a switching system according to a preferred embodiment of the invention.

FIG. 4B shows a method for querying and recovering circuit group state in the switching system according to an embodiment of the present invention. When an operator queries the circuit group state on a certain route, an MMP 120 in the self station 100 may search processors ASP0–ASPn which include the circuits allocated to the certain route, and may cause the state of the circuit groups allocated to the certain route to be successively searched. The respective processors ASP0–ASPn may query the state of the circuit group allocated to the route as a link unit, and may perform a recovery process when the states of circuits between self station 100 and counter part station 200 are not synchronized. When the states of the circuit group are reported from the respective processors ASP0–ASPn, MMP 120 in self station 100 may transmit the states of the circuit group in the certain route to the operator at terminal 130.

As shown in FIG. 4B, MMP 120 in self station 100 may check whether or not the command for querying the circuit group state in the certain route is received (S101). If the command is not received, MMP 120 may maintain a standby status (S102). When the operator inputs a command for querying the circuit group state into operator terminal 130 in self station 100 by designating a certain route which will be queried, the command inputted into the operator terminal 130 may be transmitted to MMP 120. In addition, the MMP 120 may search the processors ASP0–ASPn to identify which ASS's include the circuit group allocated to the certain route with reference to the first database (S103).

MMP 120 may then query an ASP for the state of a circuit group allocated to the certain route (S104). An ASP may query the circuit group state for circuits allocated to the certain route (S105). MMP 120 may also operate a timer in order to receive the Circuit group Request Message (CRM), that is, the result of the query, within a set time (S106). The ASP which receives the request may place the result of the query process into the CRM, and may transmit the CRM to MMP 120 in the self station. The method of performing the query process of the circuit group state allocated to the certain route of the ASP will be described later with reference to FIG. 5.

If the CRM is not transmitted from the ASP which received the request (S107 and S108) before the timer operated in the process S105 is ended, MMP 120 may store the result that the query for the circuit group state in the ASP as "not performed normally" and may decide whether or not the ASP is the last ASP among those ASPs searched in S103(S111). On the other hand, if the CRM is transmitted from the ASP which received the request (S107) before the timer is ended, MMP 120 may store the transmitted CRM (S110), and may decide whether or not the ASP which received the request is the last ASP among those ASPs searched in S103 (S111).

If the ASP which received the request is not the last ASP, MMP 120 may query the next ASP regarding the state of circuit group allocated to a certain route and may perform steps S105 through S110. However, if the ASP which received the request is the last ASP, MMP 120 may transmit a response for the query command on the basis of the CRM from the respective ASPs stored in S110 to operator terminal 130 in order to report circuit group state of the certain route.

Figure 4C:
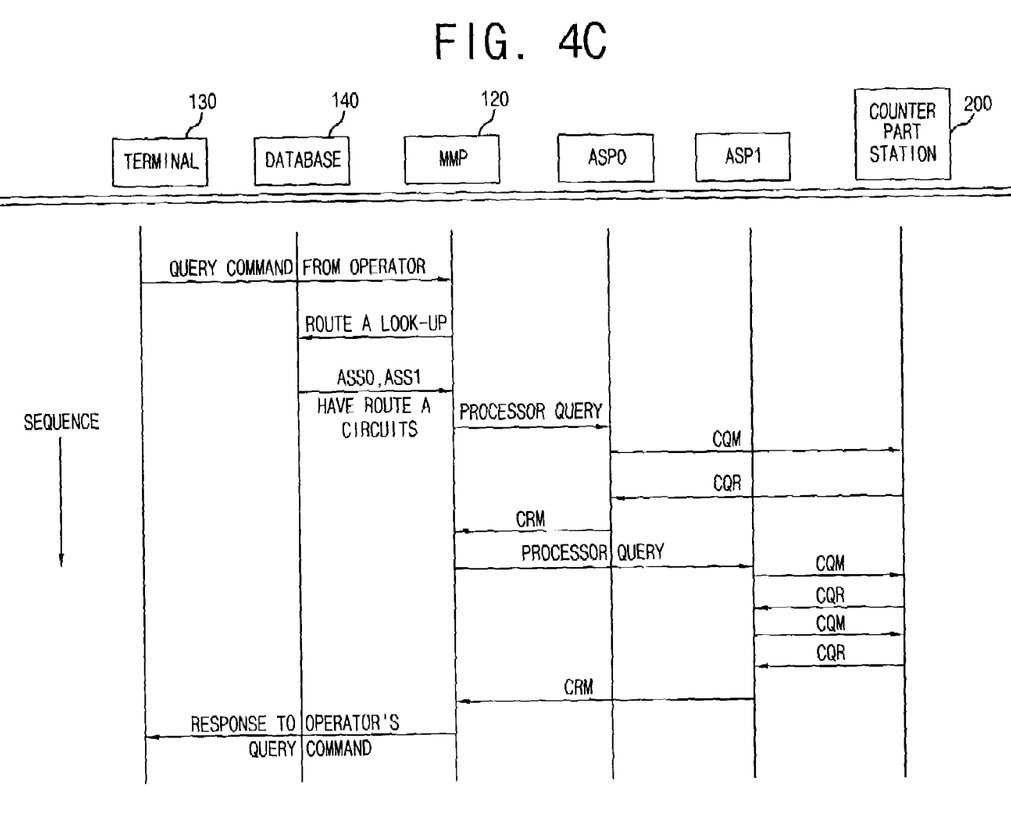
FIG. 4C is a sequence diagram illustrating a preferred embodiment of the method disclosed in FIG. 4B.

FIG. 4C is a sequence diagram illustrating an embodiment of the method in FIG. 4B. The diagram shows how data may be passed between inner structures of self station 100. In this example, an operator at terminal 130 may send a query command to MMP 120 regarding the state of circuits in route A. MMP 120 may send a route A look-up command to database 140, which may return a determination that access switching substations ASS0 and ASS1 have circuits allocated to route A. MMP 120 may then send a first processor query to ASP0 whereupon ASP0 may send a first CQM to counterpart station 200. Upon receipt of a first CQR from counterpart station 200, ASP0 may return a first CRM to MMP 120. In similar fashion, MMP 120 may send a second processor query to ASP1, whereupon ASP1 may send a second CQM to counterpart station 200. ASP1 may receive a second CQR from counterpart station 200. As indicated in FIG. 4B, for reasons discussed below, it may be necessary for ASP1 to send a third CQM to counterpart station 200. Upon receipt of a third CQR from counterpart station 200, ASP1 may return a second CRM to MMP 120. Having received the first and second CRMs from ASP0 and ASP1, respectively, MMP 120 may send a response to an operator at terminal 130 regarding the state of circuits in route A.

Figure 5:
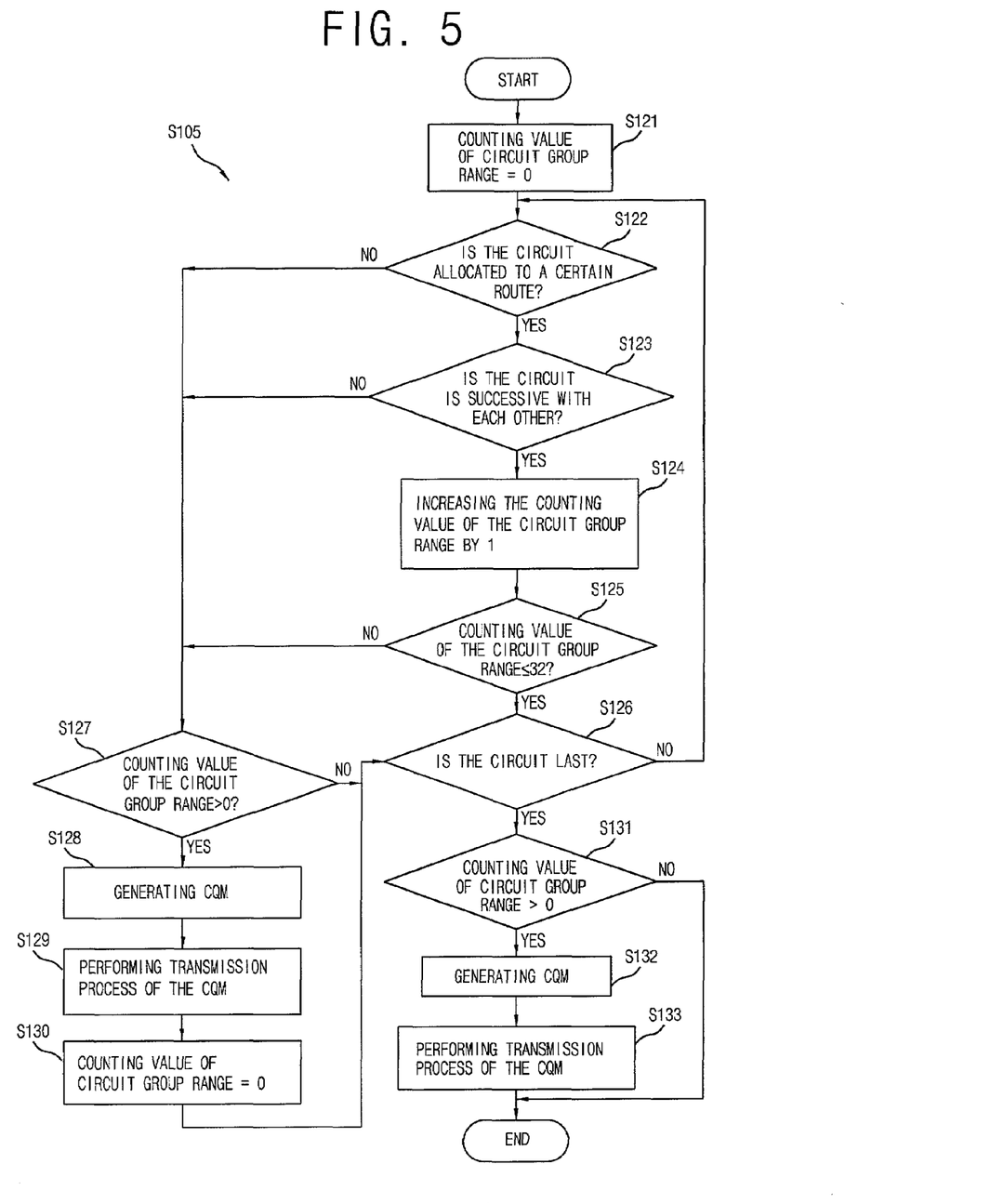
FIG. 5 is a flow chart showing a method for querying the state of circuit groups allocated to a certain route by an ASP in response to a request from an MMP (Man Machine Processor), according to a preferred embodiment of the invention.

FIG. 5 shows a method for performing the processes of querying the circuit group state allocated to a certain route according to the request of the MMP 120. As shown therein, the ASP may identify whether or not the respective circuits (identification code 0~4095) included therein are allocated to the certain route from the first mounted circuit(identification code 0) to the last mounted circuit(identification code 4095). In the identification processes above, if the circuits allocated to a certain route are successive, the circuits may be grouped so that the circuit group range is less than 32 and one CQM per circuit group is generated. If there are many circuits which are not successive with each other among the circuits allocated to the certain route, one or more additional CQMs may be generated. FIG. 3B illustrates a case where route A circuits are not successive in ASS1, and FIG. 4B illustrates a case where processor ASP1 generated two CQMs in response to such a case.

The ASP which receives a request from MMP 120 for querying the state of the circuit group allocated to a certain route may initialize a counting value of circuit group range which will be queried to '0' (S121). The ASP may take the first circuit among the mounted circuits as a "present circuit," and may identify whether or not the present circuit is allocated to the certain route with reference to the second database (S122). If the present circuit is not allocated to the certain route, the ASP may identify whether or not the counting value of circuit group range is larger than 0 (S127). If the present circuit is allocated to the certain route, the ASP may identify whether or not the present circuit is successive with a previous circuit which is allocated to the certain route (S123). If the present circuit is not successive with the previous circuit, the ASP may proceed to step S127. However, if the present circuit is the first circuit mounted on the processor or is successive with the previous circuit which is allocated to the certain route, the ASP may increase the counting value of the circuit group range by 1 (S124), and may identify whether or not the counting value of the present circuit group range is less than the number set by the recommendation, that is, 32 (S125). If the counting value of the circuit group range is not less than or equal to 32, the ASP may proceed to step S127. If the counting value of the circuit group range is not larger than 0 as the result of identifying in step S127, the ASP may identify whether or not the present circuit is the last circuit among the circuits controlled by the ASP (S126).

If the counting value of the circuit group range is larger than 0 as the result of step S127, the ASP may generate a CQM for querying the state of the circuits successively allocated to the certain route among those previous circuits (S128). In addition, the ASP may transmit the generated CQM(S129). The transmission process of the CQM will be described later with reference to FIG. 6. When the transmission process of the CQM is completed the CRM (which is generated as a result of the transmission process of the CQM) is transmitted to MMP 120, and the ASP may initialize the counting value of the circuit group range as "0" (S103) and proceed to step S126. However, if the counting value of the circuit group range is less than or equal to 32 as a result of identifying in step S125, the ASP may proceed to step S126 in which a determination is made as to whether or not the present circuit is the last circuit mounted on the processor. If the present circuit is not the last circuit controlled by the ASP, the ASP may proceed to step S122. However, if the present circuit is the last circuit as a result of identifying step S126, the ASP may determine whether the counting value of circuit group value is larger than 0 (S131). If the counting value of the circuit group range is not larger than 0, the ASP may end the query processes for the circuit group state allocated to the certain route. However, if the counting value of the circuit group range is larger than 0, the ASP may generate a CQM for querying the states of the circuits which are successively allocated to the certain route including the present circuit (S132). For example, referring to FIG. 3A, in the case where the circuits of identification code 0 through 31 among the circuit group 0~4095 included in the processor are successively allocated to route A, the ASP may generate a CQM for querying the state of circuit group in which the identification code is 0 through 31. In case of the route A, only one CQM may be generated. After that, the ASP may perform CQM transmission process as indicated in the steps S129 and S133.

Therefore, the ASP may search circuits allocated to a certain route upon receiving a processor query related to a certain route from MMP 120, group the successive circuits allocated to the certain route, and perform querying states as a circuit group unit.

Figure 6:
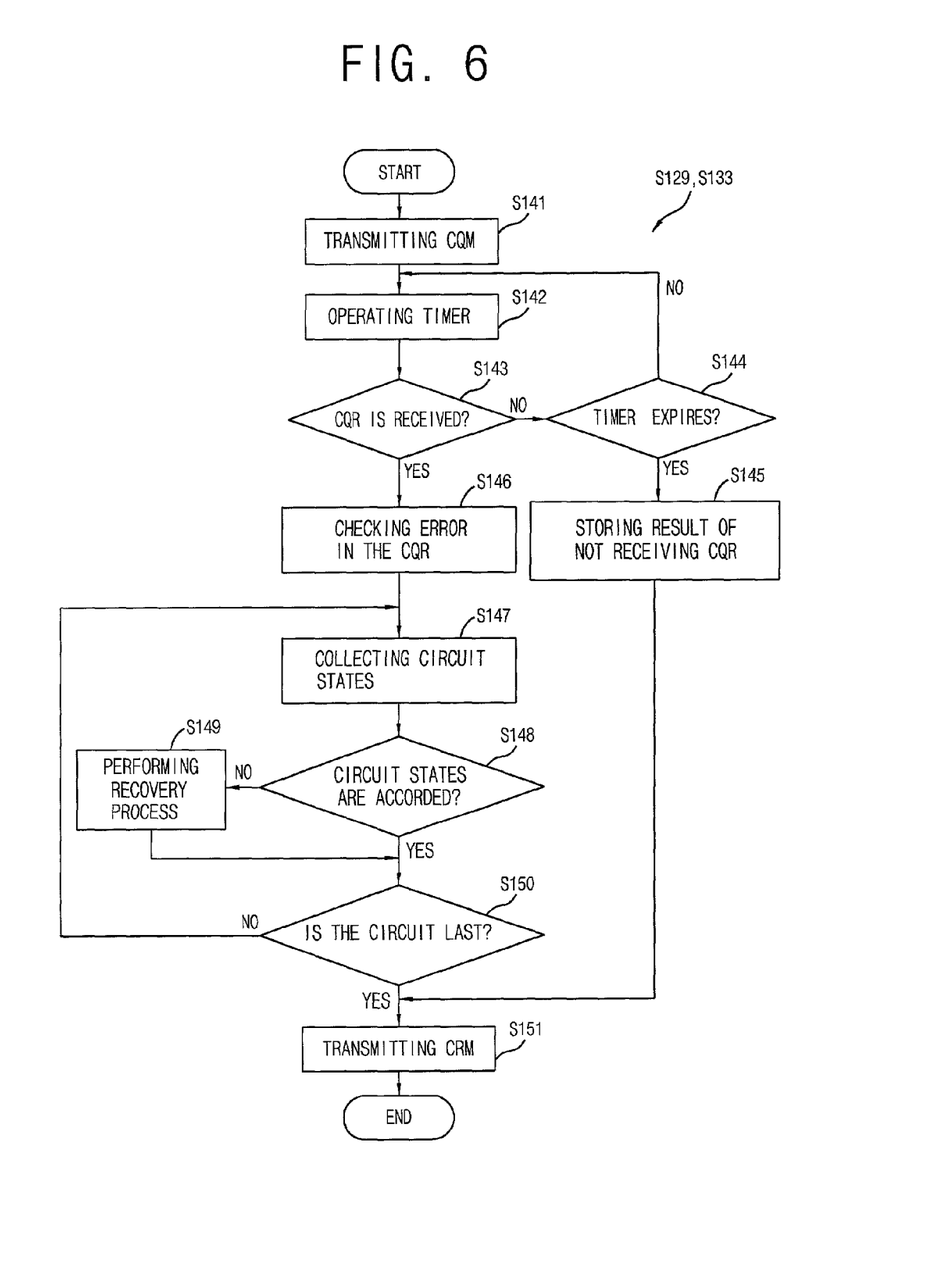
FIG. 6 is a flow chart detailing the CQM (Circuit group Query Message) transmission process in FIG. 5 according to a preferred embodiment of the invention.

FIG. 6 shows one embodiment of a CQM transmission process to be performed in steps S129 and S133 of FIG. 5. As shown therein, the ASP may transmit a CQM generated in S128 or in S132 of FIG. 5 to the counter part station 200 (S141), and may operate a timer for checking whether or not a CQR (which is a response message for the CQM) is received within a predetermined time (S142). If the CQR is not received (S143) before the timer expires (S144), the ASP may report the result as "can not process because of no response" to the MMP 120 (S145), and the MMP 120 may transmit the result to the operator at terminal 130 (S151). On the other hand, the counter part station 200 which received the CQM may perform message verification in order to identify whether or not an error is generated on the CQM. If there is no error on the CQM, counter part station 200 may collect the states of the circuits included in the CQM. The counter part station 200 may include the collected states of the circuits in the CQR, and may transmit the CQR to the ASP in the self station 100. If the CQR is transmitted from the counter part station 200 before the timer expires (S143), the ASP may perform message verification for the transmitted CQR (S146). If there is no error on the CQR, the ASP may collect state information managed by self station 100 about the circuits included in the CQM (S147).

The ASP may compare the state of a corresponding circuit included in the CQR (state of the circuit managed by counter part station 200) to the collected state of the corresponding circuit above (state of the circuit managed by self station 100) (S148). If the states of the circuit included in the CQR and of the circuit collected above are not synchronized with each other, the ASP may perform a recovery process in order to synchronize the two circuit states (S149). The recovery process will be described later with reference to FIGS. 7 and 8. When the recovery process is performed, the ASP may identify whether or not the corresponding circuit is the last circuit included in the CQM (S150). If the circuit is not the last circuit, the ASP may perform step S147 for the next circuit included in the CQM. However, if the corresponding circuit is the last circuit included in the CQM, the ASP may report the result of the circuit group state query using the CQM to MMP 120 in self station 100 through a CRM (S151).

Figure 7:
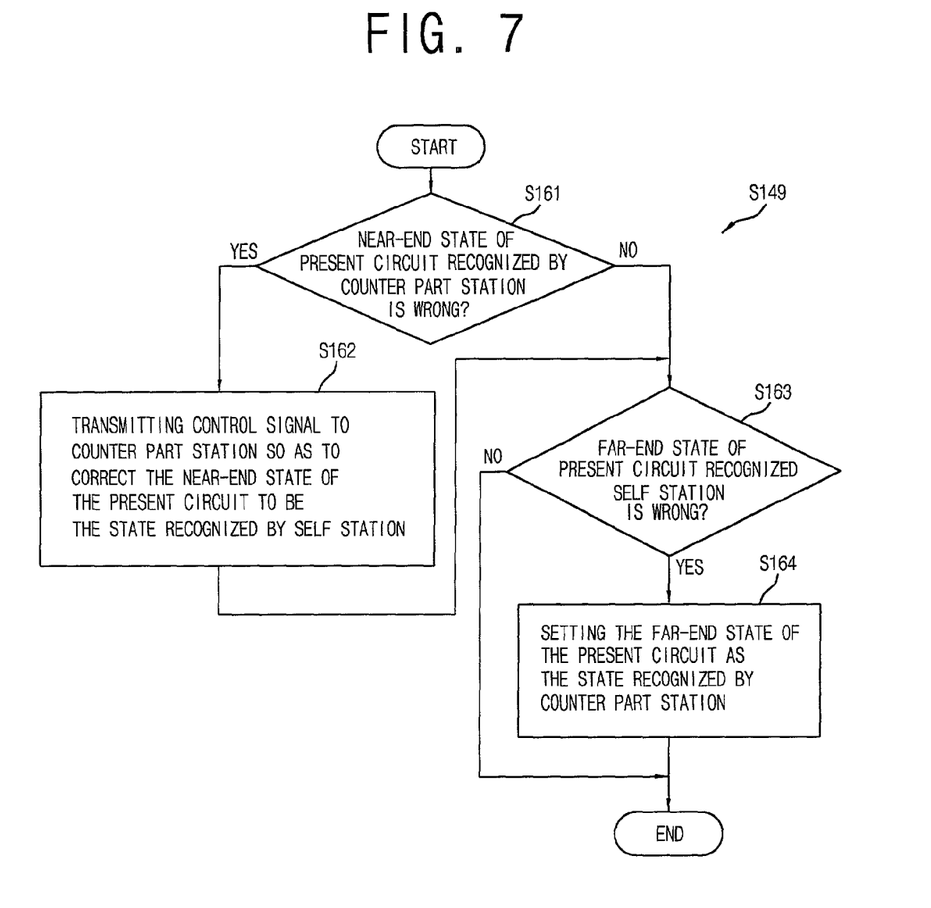
FIG. 7 is a flow chart showing a method for recovering the states of circuits between the self station and the counter part station according to a preferred embodiment of the invention.

FIG. 7 shows a method for recovering circuit states in self station 100 and counter part station 200 which are not synchronized with each other and where the state of respective circuit is divided into Near-End State and Far-End State. As shown therein, where counter part station 200 has an incorrect state of a circuit equipped in self station 100 (S161), the processor of the self station 100 may transmit a control signal to the counter part station 200 to correct the state of the circuit equipped in self station 100 (S162). On the other hand, where the self station 100 has an incorrect state of a circuit equipped in the counter part station 200 (S163), the processor of the self station 100 may set the state of the circuit as the state read and stored by the counter part station 200 (S164).

Figure 8:
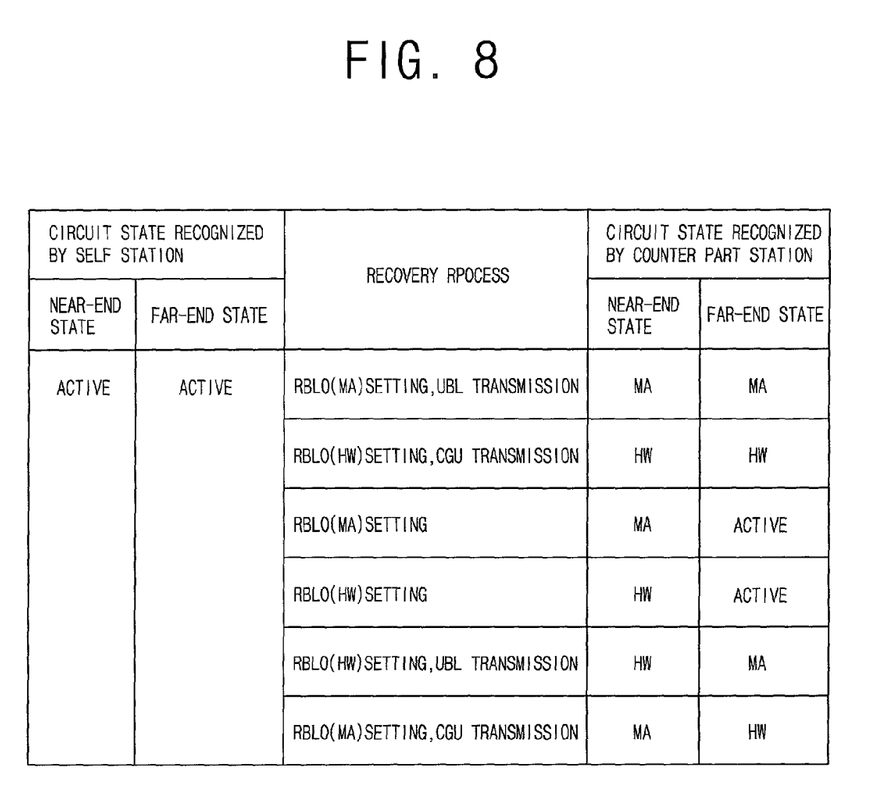
FIG. 8 is a table showing an example of recovering the state of circuits between the self station and the counter part station which are not synchronized with each other.

An example will be described with reference to FIG. 8. A Near-End State in a certain circuit, read and stored by the self station 100, may be corresponded to a Far-End Station of a certain circuit, read and stored by counter part station 200. Likewise, a Far-End State of a certain circuit, read and stored by the self station 100, may be corresponded to a Near-End State of a certain circuit read and stored by the counter part station 200. Where the Near-End State of the corresponding circuit read and stored by self station 100 is in an active state (hereinafter, referred to as "ACTIVE") and the Far-End State of the circuit read and stored by the counter part station is in a Maintenance Blocking State (hereinafter, referred to as "MA"), the processor in the self station 100 may transmit an Unblock Message (UBL) to counter part station 200 so that the counter part station 200 corrects the Far-End State of the circuit to be "ACTIVE". Also, in case that the Far-End state of the circuit read and stored by the self station 100 is "ACTIVE" and the Near-End state of the circuit read and stored by the counter part station is "MA," the processor in the self station 100 may reset the Far-End State of the circuit to "MA" using a command such as "RBLO (MA)."

As described above, according to the method for querying and recovering the circuit group state in the switching system, a process for querying and recovering the state for circuits allocated to a certain route may be automatically performed when the circuits which are allocated to a certain route are dispersed on one or more processors as a plurality of links.

In addition, according to the present invention, querying and recovering circuit group state in the switching system may be performed as a route unit, and therefore the operator can query and recover the circuit group state in a certain route by a command designating the certain route which will be queried, whereby the operating efficiency is increased.

Also, according to the present invention, a recovery process, which is performed when the states read and stored by the self station and by the counter part station are not synchronized with each other, is described in detail, and thereby a clear recovery process can be performed.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for querying and recovering circuit group state in a switching system comprising:
   inputting a command for querying states of circuit groups as a route unit; and
   performing query for the circuit group states as a route unit in accordance with the inputted command, the performing query comprising:
   determining a plurality of processors which include the circuit groups allocated to a certain route;
   querying each of the plurality of processors in order;
   querying the state of circuit groups allocated to the certain route in each of the plurality of processors; and
   reporting a response to the command for querying states of circuit groups as a route unit to an operator, when CRM (Circuit group Report Messages) are received from each of the plurality of processors.

2. The method of claim 1, wherein the determining the plurality of processors is performed by a maintenance system with reference to a database for associating processors and routes.

3. The method of claim 1, wherein the querying the state of the circuit groups allocated to the certain route in each of the plurality of processors comprises:
   selecting respective circuits successively which are included in each of the plurality of processors and identifying whether or not the selected circuit is allocated to the certain route;
   grouping circuits allocated continuously among the circuits which are allocated to the certain route;
   generating a CQM (Circuit group Query Message) for querying the states of the grouped circuits; and
   transmitting the generated CQM.

4. The method of claim 3, wherein the grouping circuits is performed so that a circuit group range is less than or equal to 32 circuits.

5. The method of claim 3, wherein the transmitting the CQM comprises:
   transmitting the generated CQM to a counter part station;
   receiving a CQR(Circuit group Query Response) from the counter part station as a response to the CQM;
   collecting the states of respective circuits included in the CQM;
   comparing the states of respective circuits included in the CQR to the collected states;
   performing a recovery process where the states of the respective circuits included in the CQR and the collected states of the respective circuits are not synchronized with each other; and
   transmitting the GRM for reporting the states of respective circuits included in the CQM to a maintenance system.

6. The method of claim 5, wherein the performing a recovery process includes at least one of (1) transmitting a control signal to the counter part station so that the state of the circuit equipped in the self station is corrected to be the state read and stored by the self station, when the Near-End State of the circuit collected by the self station is different from the Far-End State of the circuit included in the CQM and (2) setting the state of the circuit equipped in the counter part station to be the state read and stored by the counter part station when the Far-End State of the circuit collected by the self station is different from the Near-End State of the circuit included in the CQM.

7. The method of claim 1, wherein the querying the state of circuit groups allocated to the certain route in each of the plurality of processors is performed as link units.

8. A method for querying and recovering circuit group state in a processor of a switching system comprising:
   identifying whether a circuit is allocated to a certain route by successively selecting all circuits included in a processor, when a request for querying the circuit in the certain route is received from a maintenance system;
   grouping circuits allocated continuously among the circuits which are allocated to the certain route;
   generating CQM (Circuit group Query Message) in accordance with the circuit groups;
   transmitting the generated CQM to a counter part station;
   receiving CQR (Circuit group Report Message) which is a response message for the CQM from the counter part station;
   collecting states of the respective circuits included in the CQM;

comparing the states of respective circuits included in the CQR to the collected states of the respective circuits;

performing a recovery process where the states of the respective circuits included in the CQR and the states of the collected circuits are not synchronized to each other; and transmitting a CRM for reporting the result of the recovery process to the maintenance system.

9. The method of claim 8, wherein one CQM is generated for each circuit or group of circuits that is not continuous with the previous circuit allocated to the certain route.

10. The method of claim 8, wherein the performing a recovery process includes at least one of (1) transmitting a control signal to the counter part station so that the state of the circuit equipped in the self station is corrected to be the state read and stored by the self station, when the Near-End State of the circuit collected by the self station is different from the Far-End State of the circuit included in the CQM and (2) setting the state of the circuit equipped in the counter part station to be the state read and stored by the counter part station when the Far-End State of the circuit collected by the self station is different from the Near-End State of the circuit included in the CQM.

11. A system for querying and recovering circuit group state in a switching system comprising:

a self station for originating a route; and a counterpart station at the destination of a route, wherein the self station is configured to receive a command for querying states of circuit groups as a route unit, and wherein the self station and the counter part station are configured to perform the query for the circuit group states as a route unit in accordance with the received command, wherein each of the self station and counterpart station comprise:

an operator terminal for receiving commands;

a man machine processor (MMP) coupled to the operator terminal, configured to receive a command from the operator terminal, and further configured to maintain and repair a network;

a database coupled to the man machine processor for storing information related to maintenance and repair of the network; and a plurality of access switching substations (ASSs) coupled to the man machine processor, wherein each of the plurality of ASSs include an access switching processor (ASP) configured to control the state of circuit switches in the network.

12. The system of claim 11, wherein the operator terminal is configured to receive a first query command from an operator for the states of all circuits in a specified route and forward the first query command to the MMP.

13. The system of claim 12, wherein the MMP is configured to: receive the first query command from the operator terminal for the states of all circuits in a specified route; communicate with the data base to determine a plurality of ASSs which include the circuit groups allocated to the specified route; send a second query command to each of a plurality of corresponding ASPs; receive a CRM from each of the plurality of corresponding ASPs in response to the second query command; and send a message to the operator terminal in response to the first query command.

14. The system of claim 13, wherein each of the ASPs are configured to receive the second query command from the MMP, send at least one circuit group query message (CQM) to the counter part station, receive at least one circuit group query response message (CQR) from the counter part station, and send a CRM to the MMP.

15. A switching station, comprising:

an operator terminal for receiving commands;

a man machine processor (MMP) coupled to the operator terminal, configured to receive a command from the operator terminal, and further configured to maintain and repair a network;

a database coupled to the man machine processor for storing information related to maintenance and repair of the network; and a plurality of access switching substations (ASSs) coupled to the man machine processor, wherein each of the plurality of ASSs include an access switching processor (ASP) configured to control the state of circuit switches in the network.

* * * * *